3,415,904
POLYOLEFIN COMPOSITION COMPRISING AN AMINE TREATED ETHYLENE/ACRYLIC ESTER COPOLYMER AND A POLY-ALPHA-OLEFIN
Isoji Taniguchi, Ken-Ichi Maemoto, and Takeshi Simamura, Niihama, and Yoshio Kobayashi, Tomohide Yasumura, and Reizo Yamadera, Shiga-gun, Shiga-ken, Japan, assignors to Sumitomo Chemical Co., Ltd., and Toyobo Co., Ltd., Osaka, Japan
No Drawing. Filed Aug. 2, 1965, Ser. No. 476,697
Claims priority, application Japan, Aug. 13, 1964, 39/46,670
7 Claims. (Cl. 260—897)

ABSTRACT OF THE DISCLOSURE

The present disclosure provides for a process for producing a moldable poly-alpha-olefin composition, which comprises admixing poly-alpha-olefin with a modified copolymer obtainable by treating a copolymer of ethylene and an acrylic acid ester compound having the following general formula:

$$CH_2=CR_1COOR_2$$

wherein $R_1$ is hydrogen or a methyl radical, and $R_2$ alkayl, cycloalkyl, aralkyl, or aryl radical, each having 1 to 18 carbon atoms, with an amine compound having the following general formula:

wherein $R_3$ and $R_4$ each are hydrogen, alkyl, cycloalkyl, aralkyl or aryl radical, each having 1 to 18 carbon atoms, the hydrogen atoms of the above radical may be replaced by hydroxyl or dialkylamino radicals, heterocyclic radicals, dialkylamino and diarylamino radicals, and $R_3$ and $R_4$ may be combined together through the intermediary carbon, nitrogen or oxygen atom, until the major portion of the acrylate monomer is converted into the corresponding amide, said copolymer being added in an amount of 0.1 to 30% by weight, based on said polypropylene. The present invention also provides for compositions produced by the above process.

---

The present invention relates to an improved poly-alpha-olefin composition and, more particular, to a poly-alpha-olefin composition with improved affinity for dyes, and to a method for producing the same.

It is well known that poly-alpha-olefins, e.g. crystalline polypropylene and polyethylene, are moldable into fibers, films, and other shaped articles having excellent physical and mechanical properties. These poly-alpha-olefins, however, have their own intrinsic defects and, therefore, their uses in the production of general shaped articles are restricted within stringent limits. For example, since poly-alpha-olefin itself is hydrophobic and chemically inert, application of the conventional dyeing methods to the poly-alpha-olefin is difficult, and accordingly it has been difficult to dye poly-alpha-olefin in deep shades having high fastnesses to sunlight, laundering, and dry-cleaning. For this reason, much study has heretofore been made to improve the dye receptivity of poly-alpha-olefin, and a number of methods have been proposed.

One notable method comprises adding certain materials, having affinity for dye, to poly-alpha-olefin. However, such additives are generally so poorly miscible with poly-alpha-olefin that the two materials tend to be separated into two distinct phases in solid solution. The additives only exist in the form of small grains as a dispersion, and the composition is not homogeneous enough. When the additives remains dispersed in the form of small grains in the poly-alpha-olefin, the dyeing efficiency under practical conditions as considerably lowered than when it forms a solid solution. In melt-spinning, such a dispersion yields discontinual filaments when extruded through a spinnerette nozzle or suffers in drawability, resulting ultimately in more or less degradations in physical properties of the fiber. Moreover, as the fiber is subjected to frictional forces at the drawing and subsequent steps, the additive which has separated from the poly-alpha-olefin phase becomes free from the latter, resulting in uneven dyeing.

In order to overcome these defects and to improve the dye receptivity of poly-alpha-olefin we have studied a great number of substances which might be used as additives for the above-mentioned purposes. The study has resulted in the finding that a poly-alpha-olefin composition, which satisfies the above-mentioned requirements and, accordingly, is excellent in dyeability and fastnesses and, yet, retains the desirable physical and mechanical properties of poly-alpha-olefin, is obtained either by incorporating into poly-alpha-olefin a modified copolymer prepared by treating an ethylene-acrylic acid ester copolymer with amine compound, or by treating a mixture of poly-alpha-olefin and the ethylene-acrylic acid ester copolymer with amine compound.

The composition of the present invention is prepared either by admixing poly-alpha-olefin with a modified copolymer obtainable by treating a copolymer of ethylene and an acrylic acid ester compound having the following general formula:

$$CH_2=CR_1COOR_2$$

wherein $R_1$ is hydrogen atom or methyl radical, and $R_2$ is alkyl, cycloalkyl, aralkyl, or aryl radical, each having from 1 to 18 carbon atoms, with amine compound having the following general formula:

wherein $R_3$ and $R_4$ each are hydrogen atom, alkyl, cycloalkyl, aralkyl or aryl radical, each having 1 to 18 carbon atoms, the hydrogen atoms of the above radical may be substituted with hydroxyl or dialkylamino radicals, heterocyclic radicals, dialkylamino and diarylamino radicals, and $R_3$ and $R_4$ may be combined together through the intermediary carbon, nitrogen, or oxygen atom, said amine compound having one nitrogen-hydrogen bond in the molecule; or by admixing the ethylene-acrylic acid ester copolymer described above with poly-alpha-olefin and treating the resulting mixture with the amine compound described above. In either case, a useful poly-alpha-olefin composition is obtained.

The poly-alpha-olefin used in the present invention includes polyethylene, polypropylene, polybutene-1, poly-4-methylpentene-1, and the like. The isotactic polypropylene, which is produced by polymerizing propylene in the presence of the Ziegler-Natta catalyst, is preferable.

The ethylene-acrylic acid ester copolymer used in the present invention may be produced according to the conventional manner. The copolymerization reaction between ethylene and acrylic acid ester is usually carried out under ethylene pressure of 1000–2000 mg./cm.$^2$ and at 120–250° C. in the presence of a catalyst such as oxygen, organic peroxides, azo or diazo compounds, and the like.

The acrylic acid ester compounds include, methyl acrylate, ethyl acrylate, butyl acrylate, octyl acrylate, dodecyl acrylate, hexadecyl acrylate, cyclohexyl acrylate, benzyl acrylate, phenyl acrylate, methyl methacrylate, ethyl methacrylate, hexyl methacrylate, octyl methacrylate, cyclohexyl methacrylate, benzyl methacrylate, phenyl methacrylate, and the like. It is to be understood, however, that the type of radical $R_2$ in the above described general formula is of no particular importance and, therefore, from economic viewpoints, such inexpensive compounds as methyl acrylate, ethyl acrylate, and methyl methacrylate are more advantageously utilized.

The copolymers containing 1 to 30 mole percent of the acrylic acid ester units and having an intrinsic viscosity of 0.1–4 dl./g. as measured in xylene solution at 120° C. are particularly preferable.

When the copolymer contains only less than 1 mole percent of acrylic acid ester units, it does not substantially improve the dye affinity of poly-alpha-olefin so long as the copolymer is added to poly-alpha-olefin within the suitable quantity range that will hereinafter be defined, irrespective of whether the copolymer is first treated with the amine compound and, then, the resulting product is added to poly-alpha-olefin or the copolymer is first admixed with poly-alpha-olefin and, then, the mixture is treated with the amine compound. If excess amount of the copolymer, which contains only less than 1 mole percent of acrylic acid ester units, is added to poly-alpha-olefin beyond the said suitable quantity range and mixed, the resulting composition will no longer have the satisfactory mechanical properties, although the dyeability of the composition may be improved.

The modified copolymer prepared by treating the copolymer containing more than 30 mole percent of the acrylic acid ester units with the said amine compound is poorly miscible with poly-alpha-olefin. When the copolymer containing more than 30 mole percent of the acrylic acid ester units is first admixed with poly-alpha-olefin and the resulting mixture is treated with the amine compound, there is often encountered a phase separation during the amine-treatment step or at the molding step.

Since the melting point of the modified copolymer prepared by treating the copolymer with the amine compound is generally lower than that of poly-alpha-olefin, the copolymer may be used safely so long as its intrinsic viscosity ranges from 0.1 to 4.0 dl./g.

That the amine compound contains a nitrogen-hydrogen bond is important. It is by this bond that, when the above-mentioned copolymer is treated by the amine compound, the ester-type side chain is converted to an amide-type side chain. If the molecule contains two or more nitrogen-hydrogen bonds there arises a cross-linking reaction, yielding a modified copolymer unusable in the present invention. The bonds other than nitrogen-hydrogen bond e.g. hydroxyl, dialkylamino, etc., if present, would not react with the ester-type side chain of said copolymer, or the reaction would be negligible so that even if the copolymer is treated with the amine compound having such bonds, there would not be formed an unusable modified copolymer.

The amine compounds, which satisfy the above-mentioned requirements, include ammonia, methylamine, dimethylamine, ethylamine, diethylamine, octylamine, cyclohexylamine, benzylamine, aniline, diphenylamine, ethanolamine, 2-amino-pyridine, 2-aminopyrimidine, 2-amino - hydroxypyrimidine, 2,1-dimethylhydrazine, dimethylaminopropylamine, diethylaminopropylamine, dimethylaminoethylamine, N,N-dimethyl-p-phenylenediamine, N,N-diethyl-p-phenylenediamine, piperidine; pyrrolidine, pyrrole, morpholine, imidazole, etc.

The treatment of the ethylene-acrylic acid ester copolymer with the amine compound is carried out by contacting the copolymer with said amine compound at a temperature higher than 100° C. and preferably within a range of from 150° C. to 400° C. in the presence or absence of a catalyst. The catalyst may be sodium methylate, potassium hydroxide, sodium chloride, sodium nitrate, sodium carbonate, sodium amide, etc. The reaction may be carried out under either elevated or atmospheric pressure depending on the type of the amine compound and the treating temperature.

The treatment of the copolymer with the amine compound may be carried out either in the absence of a solvent; that is to say, by contacting the molten copolymer directly with said amine compound, or in the presence of water or an organic solvent. The amine compounds are ordinarily available in the form of aqueous solution, and the solution containing 20% or more of the amine compound may be economically employed. The organic solvent is primarily used for the purpose of conducting the reaction smoothly and controlling the reaction temperature. The solvents are preferably those solvents capable of dissolving the copolymer, such as benzene, toluene, xylene, decalin, tetralin, cyclohexane, tetrahydrofuran, cyclohexanol, carbon tetrachloride, etc. Generally speaking, no secondary reaction takes place in any appreciable degree when the reaction is carried out in the absence of solvent, but there arise quite small degrees of ammonium and carboxylic types of bonding in case an organic solvent is used, and some degree of carboxylic bonding when water is employed as the reaction medium.

Even when the composition of the present invention is prepared by admixing the copolymer with poly-alpha-olefin and then treating the resulting mixture with the amine compound, the amine, treatment may be carried out under the same conditions as described above. In this case, after molding into a film or fiber, for instance, the product may be treated with the amine compound under suitable condition, e.g. at a temperature above room temperature and below the melting point of the poly-alpha-olefin.

The conversion of the ester-type side chain into amide type side chain, during the course of amine-treatment of either the copolymer or the mixture of the copolymer and poly-alpha-olefin, may be varied within a range of from 2% to about 98% depending on the treatment condition. Generally speaking the higher the temperature at which said treatment is carried out, the higher the conversion of the ester-type side chain into amide type side chain. The suitable range of the conversion is between 50% and 95%. Generally speaking the higher conversion is preferable. The infrared absorption spectrum of the modified copolymer ordinarily shows absorptions for amide and ester groups, but there may be observed weak absorptions for nitrile, carboxylic and quaternary ammonium salt depending on treating conditions.

The amount of the modified copolymer or the copolymer to be added to the poly-alpha-olefin varies depending on the composition of the copolymer, but the suitable amount ranges from about 0.1 to 30% by weight based on the weight of poly-alpha-olefin. If the amount of the modified copolymer or the copolymer to be added to poly-alpha-olefin is below 0.1% by weight based on the weight of poly-alpha-olefin, the dye affinity of the resulting composition will not be as high as practically useful, while the use of more than 30% by weight of said modified copolymer or the copolymer would often result in the disappearance of some of the desirable properties of the poly-alpha-olefin. While the particularly preferred range of the modified copolymer or the copolymer to be added to poly-alpha-olefin varies depending on the concentration of the dyeing bath use, it ordinarily ranges from about 1% to about 15% by weight based on the weight of poly-alpha-olefin for fiber production and from about 1% to 25% by weight based on the weight of the poly-alpha-olefin for other molding uses.

The composition prepared as above is a homogeneous solid solution possessing a high affinity for dyes and substantially retaining the superior mechanical properties of the poly-alpha-olefin. The simultaneous attainment of excellent co-solubility of the additives and the poly-alphaolefin, and improved dye affinity of the composition is an important feature of the present invention.

The admixing of poly-alpha-olefin with the modified copolymer or with the copolymer may be performed mechanically and quite easily, because the component materials of the composition are compatible. For example, these component materials may be admixed with each other at elevated temperature on the rollers of a banbury mixer or other suitable mixing mechanism or, alternatively, the admixing may likewise be conducted by the multi-stage extrusion technique.

In this admixing or prior thereto, various poly-alpha-olefin stabilizer, such as antioxidant (e.g. alkylphenol compound), ultraviolet degradation inhibitor (e.g. benzophenone derivative), heat-resisting stabilizer (e.g. the thioether compound of carboxylic acid ester), and/or other additives (e.g. the metal salts of higher fatty acids) may be added. If such additions are made, the benefit of stabilization of the poly-alpha-olefin may also be attained in addition to the above-mentioned advantages of the present invention.

The poly-alpha-olefin composition obtained according to the present invention has an excellent affinity for direct dyes, vat dyes, acid dyes, disperse dyes, reactive dyes, metallized dyes, and other types of dyes, although disperse and metallized dyes are particularly suitable for the dyeing of the present composition.

The above-mentioned disperse and metallic dyes include, for example, Sumiplene Yellow G, Sumiplene Red G, Sumiplene Blue G (Sumiplene is the trade name of the dyes manufactured and marketed by Sumitomo Chemical Co., Ltd.), Celliton Fast Yellow G (C.I. Disperse Yellow 3, trade name of BASF), Celliton Fast Yellow 5R (C.I. Disperse Yellow 7, trade name of BASF), Celliton Fast Orange 5R (C.I. Disperse Orange I, trade name of BASF), Celliton Fast Red GG (C.I. Disperse Red 17, trade name of BASF), Celliton Fast Red 4G (trade name of BASF), Celliton Fast Violet 6B (C.I. Disperse Violet 4, trade name of BASF), Duranol Blue 2G (C.I. Disperse Blue 24, trade name of I.C.I.), Vialon Fast Yellow G (C.I. Acid Yellow 18, trade name of BASF), Vialon Fast Red G (C.I. Acid Red 226, trade name of BASF), Vialon Fast Brown R (C.I. Acid Brown 50, trade name of BASF), Vialon Fast Yellow R (trade name of BASF), Cibalan Blue BL (C.I. Acid Blue 16, trade name of Ciba). In addition, the composition of the present invention may also be dyed satisfactorily with such other dyestuffs as Xylene Fast Yellow P (trade name of Sandoz), Xylene Fast Blue PR, (trade name of Sandoz), Xylene Fast Red P (trade name of Sandoz), Xylene Fast Blue P (trade name of Sandoz), Xylene Fast Red P (trade name of Sandoz), Indanthrene Gold Yellow GK (trade name of Bayer), Indanthrene Red Violet RM (trade name of Bayer), etc.

The dyeing results may be compared by inspecting the shaped articles with naked eyes, or more exactly the comparisons may be made by using optical equipment or by measuring the take-up of dye per unit weight of the shaped article involved. Particularly in the case of fiber, it is common practice to compare the relative amounts of the dye taken up by the samples. The poly-alpha-olefin composition of the present invention may be dyed up to 100 mg./g. within the serviceable range, although the range varies depending upon the type of dye used. Even when the composition is designed for fiber-making, as high as 50 mg./g. of dyeing is possible. Furthermore, the dyed articles are highly fast to sunlight, laundering, and dry cleaning.

The homogeneity of the present composition, as well as the absence of phase separation, may be clearly detected when the dyed film, for instance, is visually inspected or examined under a microscope, or when a bundle of the dyed filaments is set with epoxy resin and cut and the cross-section thereof is microscopically examined. The homogeneity of the poly-alpha-olefin composition of the present invention may also be ascertained from the fact that, mechanical properties of the shaped articles made of the compositions is substantially equal to the articles made of the poly-alpha-olefin, or from the fact that at the extrusion into the filaments, discontinual filaments or uneven filaments are not made.

Furthermore, the compoistion of the present invention is superior to poly-alpha-olefin. Yet retaining fully the desirable qualities of the poly-alpha-olefin, the present composition possesses an improved printability when the film or other large-faced articles of the composition is printed with dye or ink. Moreover, while poly-alpha-olefin is electrically insulating and is charged extensively when rubbed, the poly-alpha-olefin composition of the present invention is far less extensively charged. It is also to be noted that while some highly crystalline poly-alpha-olefins such as isotactic polypropylene becomes brittle at a low temperature, the poly-alpha-olefin composition of the present invention is so resistant to cold that it may be safely used in all practical applications at a low temperature.

The present invention will be further illustrated in detail by the following examples, which are given by way of illustration and it is not intended to limit the invention.

Example 1

An ethylene-methyl acrylate copolymer (5.4 mole percent comonomer) was treated with methylamine to prepare a modified copolymer having intrinsic viscosity, 0.822 (in xylene at 120° C.), melting point, 60–70° C., and N, 2.2% by weight. The infrared absorption spectrum of the modified copolymer revealed that more than 95% of ester groups have been converted to amides.

10% by weight (based on the weight of polypropylene powder) of the copolymer was added to polypropylene powder and mixed. The resulting mixture was extruded into filaments at 210° C. The filaments were drawn to 400% initial length in hot water at 95° C. and heat-treated at 120° C. for 30 minutes to prepare a fiber. The resulting fiber had strength 4.5 g./d., and elongation 36%. These figures represented only negligible reductions as compared with ordinary polypropylene fiber.

The fiber was dyed under the following conditions: disperse dye, Sumiplene Red G (trade name of Sumitomo Chemical Co., Ltd.) 3% OWF, nonionic surfactant 2% OWF, anionic surfactant 2% OWF, liquid ratio 50/1, 100° C. 60 minutes. The dyed fiber was soaped with a 0.5 g./l. of marseilles soap for 20 minutes. The fiber could be dyed to a deep red shade, which was found to correspond to the JIS 5th grade in fastnesses to sunlight, laundering and rubbing, and the JIS 3rd grade in fastness to dry cleaning with perchloroethylene. A mircroscopic examination of the cross-scction of the dyed fiber revealed that the modified copolymer had been homogeneously dissolved in the polypropylene without signs of phase separation.

Example 2

The same ethylene-methyl acrylate copolymer as in Example 1 was treated with dimethylamine to prepare a modified copolymer having intrinsic viscosity, 0.879, melting point, 70–77° C., and N, 1.8% by weight.

10% by weight (based on the weight of polypropylene powder) of the modified copolymer was added to polypropylene powder and mixed. This mixture was extruded into filaments at 210° C. The filaments were drawn to 400% initial length in hot water at 95° C., and heat-treated at 120° C. for 30 minutes to prepare a fiber. The resulting fiber had strength, 4.7 g./d. and elongation, 40.6%. There was only a negligible reduction in strength as compared with ordinary polypropylene fiber.

The fiber prepared as above was dyed under the following conditions: Disperse dye, Celliton Fast Yellow G (trade name of BASF), 3% OWF, nonionic surfactant 2 OWF, anionic surfactant 2% OWF, 100° C., 60 minutes. The dyed fiber was then soaped in a 0.5 g./l. of marseilles soap bath at 60° C. for 20 minutes, whereby a yellow fiber was obtained. The fiber was found to correspond to the JIS 5th grade in fastnesses to sunlight, laundering, rubbing and dry cleaning with perchloroethylene. A microscopic examination of the cross-section of the dyed fiber revealed it has been evenly dyed without signs of phase separation between the modified copolymer and polypropylene.

The ordinary polypropylene fiber containing none of said modified copolymer could not be dyed but slightly stained by the above-mentioned dye.

Example 3

An ethylene-methyl methacrylate copolymer (13.2 mole percent comonomer) was treated with dimethylamine to prepare a modified copolymer having intrinsic viscosity, 0.742, melting point, 65–71° C., and N, 3.5% by weight. 10% by weight (based on the weight of polypropylene powder) of the modified copolymer was added to polypropylene powder and mixed. The resulting mixture was extruded into filaments at 210° C. The filaments were drawn to 400% initial length in hot water at 95° C. and, then heat-treated at 120° C. for 30 minutes to prepare a fiber. The resulting fiber had strength, 4.3 g./d. and elongation, 42.8%.

The fiber was dyed under the following conditions: metallized dye, Vialon Fast Red G (trade name of BASF), 5% OWF, nonionic surfactant 2% OWF, anionic surfactant 2% OWF, ammonium sulfate 5% OWF, liquid ratio: 50/1, 100° C., 60 minutes. The dyed fiber was soaped in a 0.5 g./l. of marseilles soap bath at 60° C. for 20 minutes, whereby a deep-red fiber was obtained. The dyed fiber was found to correspond to the JIS 5th grade in fastnesses to sunlight, laundering, rubbing, and dry cleaning with perchloroethylene. A microscopic examination of the cross-section of this fiber revealed that it had been evenly dyed without signs of phase separation between the modified copolymer and polypropylene.

The ordinary polypropylene fiber containing none of said modified copolymer could not be dyed but slightly stained by the above-mentioned dye.

Example 4

The fiber prepared according to Example 3 was dyed under the following conditions: 1:2-metallized dye, Cibalan Blue BL (trade name of Ciba) 5% OWF, nonionic surfactant 2% OWF, formic acid 2% OWF, liquid ratio 50/1, 120° C., 60 minutes. The fiber was dyed medium blue. The dyed fiber was found to correspond to the JIS 5th grade in fastnesses to sunlight, laundering, rubbing and dry cleaning with perchloroethylene.

When dyeing was conducted by adding 5 g./l. of o-chlorobenzene as a swelling agent to the above described bath, deep blue fiber was obtained. The dyed fiber was found to correspond to the JIS 5th grade in fastnesses to sunlight, laundering, rubbing and dry cleaning with perchloroethylene.

The fiber was evenly dyed to the core in both dyeing methods.

Example 5

The same ethylene-methyl acrylate copolymer as in Example 1 was treated with N,N-dimethyl-p-phenylenediamine to prepare a modified copolymer having intrinsic viscosity, 0.933, melting point, 65–74° C., and N, 2.72% by weight. 5% by weight (based on the weight of polypropylene powder) of the modified copolymer was added to polypropylene powder and mixed. The mixture was extruded into filaments in the same manner as Example 1. The resulting fiber had strength, 4.8 g./d. and elongation, 48.5%.

The fiber was dyed under the following conditions: disperse dye, Duranol Blue 2G (trade name of I.C.I.) 3% OWF, nonionic surfactant 2% OWF, anionic surfactant 2% OWF, 100° C., 60 minutes. The fiber was then soaped with a 0.5 g./l. of marseilles soap bath at 60° C. for 20 minutes, whereby the fiber was dyed brilliant blue.

The dyed fiber was found to correspond to the JIS 5th grade in fastnesses to sunlight, laundering, and rubbing, and the JIS 3rd grade in fastness to dry cleaning with perchloroethylene. It was evenly dyed to the core. The ordinary polypropylene fiber could only be stained pale blue with the same dye.

Example 6

An ethylene-ethyl acrylate copolymer (6.0 mole percent comonomer) was treated with pyrrolidine to prepare a modified copolymer having intrinsic viscocity, 1.08, melting point, 64–71° C., and N, 1.94% by weight.

10% by weight (based on the weight of polypropylene powder) of the modified copolymer was added to polypropylene powder and mixed. The mixture was extruded into filaments in the same manner as Example 1. The resulting fiber had strength, 4.6 g./d. and elongation, 52.4%.

The fiber was dyed under the following conditions: disperse dye, Celliton Fast Red 4G (trade name of BASF) 3% OWF, nonionic surfactant 2% OWF, anionic surfactant 2% OWF, liquid ratio 50/1, 100° C., 60 minutes The dyed fiber was then soaped at 60° C. for 20 minutes whereby it was dyed deep red.

The dyed fiber was found to correspond to the JIS 4th grade in fastness to sunlight, the JIS 5th grade in fastnesses to laundering and rubbing, and JIS 3rd grade in fastness to dry cleaning. The fiber was dyed evenly to the core. The ordinary polypropylene fiber could be only stained with the same dye.

Example 7

An ethylene-methyl acrylate copolymer (5.4 mole percent comonomer) was treated with N,N-diethylpropylenediamine to prepare a modified copolymer having intrinsic viscosity, 0.96, melting point, 64–71° C., and N, 3.78% by weight. 10% by weight (based on the weight of polypropylene powder) of the modified copolymer was added to polypropylene powder and mixed. The mixture was extruded into filament in the same manner as in Example 1. The resulting fiber had strength, 4.5 g./d. and elongation, 50.2%. There was only negligible reduction in strength as compared with ordinary polypropylene fiber.

The fiber was dyed under the following conditions: metallized dye, Vialon Fast Yellow R (trade name of BASF) 5% OWF, nonionic surfactant 2% OWF, anionic surfactant 2% OWF, ammonium sulfate 5% OWF, 100° C., 1 hour. The above procedure yielded a deep-yellow fiber.

The fiber was found to correspond to the JIS 5th grade in fastnesses to sunlight, laundering, dry cleaning, and rubbing. A microscopic examination of the cross-section of this fiber revealed that the modified copolymer had been homogeneously admixed with said polypropylene without signs of phase separation. Ordinary polypropylene fiber could not be dyed with the same dye.

Example 8

The same fiber as in Example 7 were dyed with the following acid dyes: Xylene Fast Yellow P, Xylene Fast Red P, and Xylene Fast Blue P respectively (each trade name of Sandoz). Dyeing conditions: dye 5% OWF, nonionic surfactant 2% OWF, $H_2SO_4$ 5% OWF, dichlorobenzene 5 g./l., liquid ratio 50/1, 120° C., 1 hour. The dyed fiber was then soaped with a 0.5 g./l. of marseilles soap bath at 60° C. for 20 minutes. The above procedure yielded medium yellow, medium red, and medium blue fibers respectively.

The dyed fibers were found to correspond to the JIS 5th grade in fastnesses to sunlight, laundering, rubbing, and dry cleaning. A microscopic examination of the cross-section of this fiber revealed that the fiber had been dyed evenly to the core. Ordinary polypropylene fiber could not be dyed at all with the above dyes.

Example 9

An ethylene-methyl acrylate copolymer (12.2 mole percent comonomer) was treated with ammonia to prepare a modified copolymer having intrinsic viscosity, 0.969, and melting point, 88–96° C.

10% by weight (based on the weight of polypropylene powder) of the modified copolymer was added to polypropylene powder and mixed. The mixture was extruded in the same manner as in Example 1. The resulting fiber had strength, 3.9 g./d. and elongation, 44%.

The fiber was dyed under the following conditions: disperse dye, Sumiplene Blue G (trade name of Sumitomo Chemical Co., Ltd.) 3% OWF, nonionic surfactant 2% OWF, anionic surfactant 2% OWF, liquid ratio 50/1, 100° C., 1 hour. The dyed fiber was then soaped with a 0.5 g./l. of marseilles soap bath at 60° C. for 20 minutes. The above procedure yielded a deep blue fiber. The dyed fiber was found to correspond to the JIS 5th grade in fastnesses to sunlight, laundering, and rubbing, and the JIS 2nd–3rd grade in fastness to dry cleaning with perchloroethylene.

Ordinary polypropylene fiber could only be dyed in a pale-medium shade with the same dye.

Example 10

An ethylene-ethyl acrylate copolymer (5.8 mole percent comonomer) was treated with methylamine to prepare a modified copolymer having intrinsic viscosity, 0.739, melting point, 88–100° C., N, 2.40% by weight, and amide-conversion, 95.5%. 10% by weight (based on the weight of polypropylene powder) of this modified copolymer was added to poly-alpha-olefin and mixed. The mixture was extruded into filaments in the same manner as in Example 1. The resulting fiber had strength, 4.6 g./d. and elongation, 40%. The fiber was only a negligible reduction in strength as compared with ordinary polypropylene fiber.

The fiber was dyed under the following conditions: Metallized Vialon Bordoux R (trade name of BASF) 3% OWF, nonionic surfactant 2% OWF, ammonium sulfate 5% OWF, o-chlorobenzene as carrier 5 g./l., liquid 50/1, 100° C., 1 hour. The fiber was then soaped with a 0.5 g./l. of marseilles soap bath at 60° C. for 20 minutes. The above procedure yielded a deep brown fiber. The dyed fiber was found to correspond to the JIS 5th grade in fastnesses to sunlight, laundering, and rubbing, and the JIS 4th–5th grade in fastness to dry cleaning. A microscopic examination of the cross-section of the dyed fiber revealed that it had been dyed evenly to the core.

Ordinary polypropylene fiber could not be dyed with the same dye.

Example 11

The same ethylene-ethyl acrylate copolymer as in Example 10 was treated with diethylamine to prepare a modified copolymer having intrinsic viscosity, 0.685, melting point, 80–95° C., N. 0.88% by weight, and amide-conversion 35.4%.

10% by weight (based on the weight of polypropylene powder) of the modified copolymer was added to polypropylene powder and mixed. The resulting mixture was extruded into filaments in the same manner as in Example 1. The resulting fiber had strength, 4.5 g./d. and elongation, 43.8%.

The fiber was dyed under the following conditions: disperse dye, Palenil Blue 7G (trade name of BASF) 3% OWF, nonionic surfactant 2% OWF, anionic surfactant 2% OWF, anionic surfactant 2% OWF, liquid ratio 50/1, 100° C., 1 hour. The fiber was then soaped with a 0.5 g./l. mareseilles soap bath at 60° C. for 20 minutes. The above procedure yielded a brilliant blue fiber. The dyed fiber was found to correspond to the JIS 5th grade in fastnesses to sunlight, laundering, and rubbing, and the JIS 3rd grade in fastness to dry cleaning with perchloroethylene. A microscopic examination of the cross-section of the dyed fiber revealed that it had been dyed evenly to the core.

Ordinary polypropylene fiber could only be slightly stained with the same dye.

What we claim is:

1. A process for producing a moldable polypropylene composition which comprises admixing polypropylene with a modified copolymer obtainable by treating a copolymer of ethylene and an acrylic acid ester compound having the following general formula:

$$CH_2=CR_1COOR_2$$

wherein $R_1$ is hydrogen atom or methyl radical, and $R_2$ is alkyl, cycloalkyl, aralkyl, or aryl radical, each having from 1 to 18 carbon atoms, with amine compound having the following general formula:

wherein $R_3$ and $R_4$ each are hydrogen atom, alkyl, cycloalkyl, aralkyl or aryl radical, each having 1 to 18 carbon atoms, the hydrogen atoms of the above radical may be replaced by hydroxyl or dialkylamino radicals, heterocyclic radicals, dialkylamino and diarylamino radicals, and $R_3$ and $R_4$ may be combined together through the intermediary carbon, nitrogen, or oxygen atom, until 50–95% of the acrylate is converted into the corresponding amide, said copolymer being added in an amount of 0.1 to 30% by weight based on said polypropylene.

2. A process according to claim 1, wherein the acrylic acid ester is methyl acrylate, ethyl acrylate or methyl methacrylate.

3. A process according to claim 1, wherein the amine compound is ammonia, methylamine, dimethylamine, diethylamine, pyrrolidine or N,N-diethylpropylenediamine.

4. A process according to claim 1, wherein the copolymer contains 1 to 30 mole percent of the acrylic acid ester unit and possesses a value ranging from 0.1 to 4.0 dl./g. of intrinsic viscosity.

5. A composition prepared by the process according to claim 1.

6. An article shaped from the composition prepared by the process according to claim 1.

7. A polypropylene fiber having an excellent affinity for disperse dyes and metallized dyes formed from a composition prepared by the process according to claim 1.

References Cited

UNITED STATES PATENTS

| | | | |
|---|---|---|---|
| 3,337,517 | 8/1967 | Anspon | 260—86.7 |
| 3,156,743 | 11/1964 | Coover et al. | 260—897 |
| 3,300,548 | 1/1967 | Baum et al. | 260—897 |
| 2,953,541 | 9/1960 | Pecha et al. | 260—45.5 |

SAMUEL H. BLECH, *Primary Examiner.*

C. J. SECCURO, *Assistant Examiner.*

U.S. Cl. X.R.

260—86.7, 41; 8—55, 115.5